United States Patent
Modeo (10) Patent No.: US 7,634,280 B2
(45) Date of Patent: Dec. 15, 2009

(54) METHOD AND SYSTEM FOR AUTHENTICATING MESSAGES EXCHANGED IN A COMMUNICATIONS SYSTEM

(75) Inventor: Leonardo Modeo, Rome (IT)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 11/346,109

(22) Filed: Feb. 2, 2006

(65) Prior Publication Data

US 2006/0183489 A1   Aug. 17, 2006

(30) Foreign Application Priority Data

Feb. 17, 2005   (EP)   ................................. 05101175

(51) Int. Cl.
    *H04W 4/00*    (2009.01)
(52) U.S. Cl. .................. 455/466; 455/411; 455/418; 455/410; 705/16; 705/44; 705/71; 705/72; 705/76; 713/155; 713/156; 713/168; 713/170; 713/171; 713/175; 713/176; 713/182; 713/185
(58) Field of Classification Search .................. 455/410, 455/411, 418, 466; 705/16, 44, 71, 72, 76; 713/155, 156, 168, 170–171, 175–176, 182, 713/185
    See application file for complete search history.

(56) References Cited

U.S. PATENT DOCUMENTS

| | | | |
|---|---|---|---|
| 6,766,453 B1 * | 7/2004 | Nessett et al. | ................ 713/171 |
| 2002/0023208 A1 * | 2/2002 | Jancula | ....................... 713/156 |
| 2003/0069792 A1 * | 4/2003 | Blumenthal | .................. 705/16 |
| 2003/0115461 A1 * | 6/2003 | O'Neill | ....................... 713/170 |
| 2003/0149880 A1 * | 8/2003 | Shamsaasef et al. | ......... 713/182 |
| 2003/0236981 A1 | 12/2003 | Marmigere et al. | .......... 713/168 |
| 2004/0019564 A1 * | 1/2004 | Goldthwaite et al. | ........... 705/44 |
| 2004/0078337 A1 * | 4/2004 | King et al. | ..................... 705/51 |
| 2004/0210756 A1 * | 10/2004 | Mowers et al. | ............... 713/168 |
| 2005/0132201 A1 * | 6/2005 | Pitman et al. | ................ 713/176 |

FOREIGN PATENT DOCUMENTS

FR   2817108   11/2000

* cited by examiner

*Primary Examiner*—Stephen M D'Agosta
(74) *Attorney, Agent, or Firm*—Schmeiser, Olsen & Watts; William H. Steinberg (57) ABSTRACT

In a communications system supporting the exchange of messages, a method for authenticating messages, comprising: having a message sender send a message to be authenticated to a signature generator entity in the communications system; having the signature generator entity generate a signature with respect to the received message, the signature being dependent on the message sender; having the signature generator entity send back to the message sender an authenticated message, the authenticated message including the generated signature; having the message sender forward the authenticated message to a message recipient; having the message recipient send the received message to a signature verifier entity in the communications system; having the signature verifier entity verify the validity of the signature, and notifying the message recipient of an outcome of the validity verification.

19 Claims, 10 Drawing Sheets

METHOD AND SYSTEM FOR AUTHENTICATING MESSAGES EXCHANGED IN A COMMUNICATIONS SYSTEM

TECHNICAL FIELD

The present invention relates generally to the field of telecommunications and particularly to communications system supporting services of messaging between users, for example mobile telephone networks supporting messaging services. More particularly not but limitatively, the invention relates to the field of mobile business (m-business) or mobile commerce (m-commerce).

BACKGROUND ART

In the last few years, person-to-person wireless communications exploiting Short Messaging Service (SMS) technology has become an extremely common way to exchange textual information while on-the-move. The great popularity of this method of communicating is evidenced by the fact that billions of SMS messages are exchanged per year all over the world.

Ease of use and simple interface are the major advantages of SMS technology, which can be approached even by unaccustomed users.

The popularity of SMS-based communications has also been suggested to exploit such technology for implementing m-business. SMS-based business applications have thus been developed that enable users performing transactions, such as for example remote banking operations, exploiting their cellular phone, via SMS messages.

However, many SMS-based business applications pose a specific need for message integrity and non-repudiation. For example consider SMS-based urgent authorizations to perform banking operations, or SMS-based procurement authorizations in a corporate or government environment: the subject receiving the SMS message has a reasonable doubt of whether the message is authentic, and has been issued by the supposed message sender. The need to ensure the authenticity of the SMS messages thus arises.

Today, solutions for digital signatures in wireless communications mostly rely on implementations of X509-like certificates on board of mobile communications terminals, e.g. cellular phones, to implement a digital signature scheme that actually resembles those adopted for Internet browsers. An example of such standards is the Wireless Identity Module (WIM) technology, adopted by some providers of m-commerce services for making mobile-payment (m-payment) transactions secure and trusted. The WIM is a security module that is usually implemented in the Subscriber Identity Module (SIM) card provisioned by a mobile telephony operator, for WAP applications. A Public Key Infrastructure (PKI) is also needed to manage the X509-like certificates issued to the WIM.

A disadvantage of this solution is that, in order to implement the WIM, special SIM cards have to be provisioned to the users, by either the mobile telephone network operator or the application service providers, or both. Also, the implementation and management of the PKI is costly. Moreover, this solution exhibits a scarce usability, i.e. it is not very user-friendly, because most mobile phone users are not accustomed to, and do not feel comfortable managing digital certificates on their cellular phones.

Although not as standard as the WIM, approaches have been attempted to implement special-purpose SIM cards that can embed some software adapted to perform digital signature for SMS messages. In this case X509-like certificates are also required, and there is the drawback that special-purpose SIM cards have to be provisioned to the users by the mobile telephone network operator and/or by the application service providers. Also, user-friendliness is again scarce, because digital certificates need to be handled.

In a field different from m-business, Patent Application Publication US-A1-2003/0236981 faces the problem of providing a security solution for wireless terminal user equipment remotely managed through SMS messages (so-called "configuration SMSs" that enable the mobile devices to be remotely managed by a remote device management application system, for e.g. changing parameters or software elements in the remotely managed device). The management system generates a digital signature computed with an International Mobile Equipment Identity (IMEI) number as a key, and includes the digital signature in an available field of the SMS message. The receiving wireless terminal equipment verifies the digital signature of a received configuration SMS and, in case the verification is not correct, the configuration SMS is rejected. This solution requires that the receiving wireless terminal equipment be configured (i.e., it embeds dedicated software, e.g. in the SIM card or in the cellular phone) for digital signature verification.

French Publication FR 2 817 108 describes electronic payments made through a GSM mobile terminal over GSM/GPRS and UMTS networks. Authentication makes use of the mobile terminal's SIM card which stores an applet SIM Toolkit. The Applicant observes that also in this case there is the need of special-purpose SIM cards, embedding the application software adapted to implement the authentication.

OBJECTS & SUMMARY OF THE INVENTION

One object of the present invention is to provide authentication of messages exchanged in a communications system, particularly but not limitatively person-to-person or person-to-machine, or machine-to machine messages exploited for m-business applications.

Another object of the present invention is to provide a new approach to the authentication of SMS messages.

According to an aspect of the present invention, a method for authenticating messages in a communications system supporting the exchange of messages is provided. The method comprises sending a message to be authenticated from a message sender to a signature generator entity in the communications system, the signature generator entity generating a signature with respect to the received message, the signature being dependent on the message sender, and sending back to the message sender an authenticated message, the authenticated message including the generated signature, forwarding the authenticated message from the message sender to a message recipient, sending the received message from the message recipient to a signature verifier entity, and the signature verifier entity verifying the validity of the signature, and notifying the message recipient of the outcome of the validity verification.

According to another aspect of the present invention, a system for authenticating messages in a communications system is provided. The system comprises a message sender sending a message to be authenticated to a signature generator entity in the communications system, the signature generator entity generating a signature with respect to the received message, the signature being dependent on the message sender, and sending back to the message sender an authenticated message, the authenticated message including the generated signature, the message sender forwarding the authenticated message to a message recipient, the message recipient sending the received message to signature verifier entity and the signature verifier entity verifying the validity of the signature, and notifying the message recipient of the outcome of the validity verification.

The proposed method and system provide a simple approach to the digital signature of messages exchanged in a communications system, particularly in a system for wireless, mobile communications; the proposed new approach is particularly useful for authenticating messages, like SMS messages, that are utilized for example in m-business applications, so as to allow the subjects involved in a transaction to trust the transaction to messages.

The method and system proposed exhibit a high usability (they are very user-friendly, and do not pose any burden on the users, which are simply required to compile and send a message, e.g. an SMS message), and in a preferred embodiment of the invention, when the proposed method and system are adopted in a mobile telephone network like a GSM network, there is no need for any special-purpose SIM card or software embedded in the users' communications terminals, e.g. cellular phones. Thus, in the preferred embodiment of the present invention, the implementation of the proposed solution does not require updating/changing cellular phone and/or SIM cards, and is also independent from the communications system infrastructure, e.g. from the mobile telephone network operator infrastructure.

All these features are regarded as promising for a rapid adoption and diffusion of the solution. The proposed message signature mechanism, particularly suitable for digitally signing SMS messages, is significantly cheaper compared to the known mechanisms used for signing SMS messages, exploiting digital signatures based on X509 certificates.

Other aspects of the invention concern a service for authenticating messages, particularly in the form of a Web service.

The above objects, advantages, and features of the present invention will become more readily apparent from the following detailed description of the presented preferred embodiments as illustrated in the accompanying drawings.

DETAILED DESCRIPTION OF THE PREFERRED EMBODIMENT(S)

Figure 1:
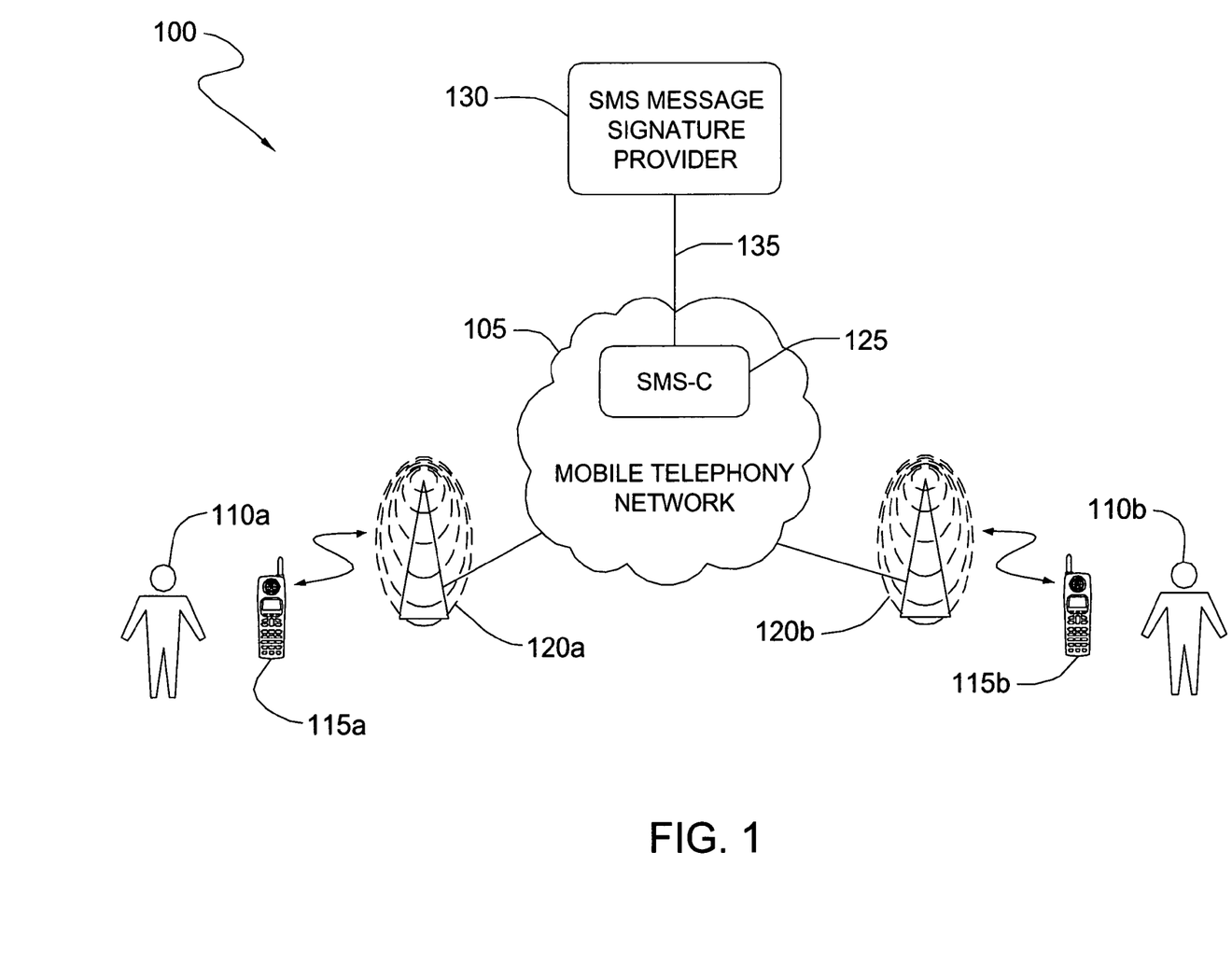
FIG. 1 schematically illustrates a communications system implementing a message authentication mechanism according to an embodiment of the present invention.

With reference to the drawings, FIG. 1 schematically illustrates a communications system according to an exemplary embodiment of the present invention, in terms of the components thereof relevant to the understanding of the example to be described.

The exemplary communications system is globally identified by reference numeral 100, and includes a wireless, mobile communications network 105, particularly a mobile telephone network such as, for example, a second-generation cellular network, e.g. a cellular network compliant to the General System for Mobile communications (GSM) standard, or a third-generation cellular network, e.g. compliant to the Universal Mobile Telecommunications System (UMTS) standard, or equivalent or corresponding standards. The Mobile telephone network 105 may be enhanced with infrastructure components enabling packet-switched communications, for example, the mobile telephony network may include a GPRS, General Packet Radio Service, an EDGE, Enhanced Data Rates for global Evolution, or an Internet protocol Multimedia Subsystem (IMS), infrastructure.

Wireless communications network 105 enables subscriber users owning suitable mobile communications terminals, e.g. GSM cellular phones, which are registered in the wireless communications network to communicate with other users which are also subscribers to the wireless communications network and registered therein, such as for example the two users 110a and 110b, owning the mobile communications terminals 115a and 115b, respectively. It is pointed out that wireless communications network 105 also enables communications between a generic user, registered therein, with another user that is registered in a different wireless communications network, for example, a mobile telephone network operated by a different operator, or covering a different geographic area, actuating a so-called "roaming" procedure, as well as with a user of a wired, Public Switched Telephone Network (PSTN).

In the exemplary case wireless communications network 105 is or includes a GSM network, in a way per-se known in the art that a plurality of Base Station Subsystems (BSSs) is typically provided. Each BSS provides coverage for mobile communications in a respective geographic region, and the generic BSS may comprise a plurality of Base Transceiver Stations (BTSs), e.g. the two BTSs 120a and 120b, each one covering a respective area, typically referred to as a "cell", within the region covered by the BSS. The generic BTS handles radio communications with the mobile communications terminals that are located in the BTS's cell. A Base Station Controller (BSC) is in charge of several BTSs, instructing the different BTSs regarding the information to be transmitted to/received from the mobile communications terminals on specified physical, radio communication channels. Groups of different BSSs are connected to respective Mobile Switching Centers (MSCs), acting as gateway to other MSCs of the same mobile telephony network 105, to the MSCs of other mobile telephony networks (of different network operators), and to the PSTN. The generic MSC is associated with a Home Location Register (HLR), containing subscripting data of users subscriber to the mobile telephone network, particularly mobile phone numbers, and with a Visitor Location Register (VLR), containing information on where the various users are located at a given time, i.e., under which cell the users' cellular phones are registered at that time. Based on this information, the MSC switches, i.e., properly routes calls from callers to called users.

Wireless communications network 105 supports a messaging service, particularly but not limitatively a text messaging service, for example an SMS messaging service. To this purpose, an SMS Center (SMS-C) 125 is provided, to manage the distribution of SMS messages to intended destinations.

An SMS message normally includes a payload field, typically about 140 Bytes long. The payload field may include a string of alphanumeric characters, with a predetermined coding (e.g., an eight-bit coding). SMS messages can carry text or data, e.g. for software applications resident in the destination mobile phone, such as the WAP browser.

In very general terms, the SMS messaging service operates in the following way, a user, e.g. user 110a composes, on his/her cellular phone 115a, the SMS message, specifying the phone number of the destination user, e.g. the cellular phone number of user 110b. The SMS message is then sent, from sender user's cellular phone 115a, to SMS-C 125, which manages the delivery of the SMS message in a "store & forward" way: in case the SMS message, upon receipt, cannot be delivered to the cellular phone of the intended destination user 110b, for example because the latter is temporarily unavailable, e.g. because cellular phone 115b is switched off or out of the coverage area. The SMS message is stored at SMS-C 125, which retries to deliver the SMS message at a later time, for example as soon as cellular phone 115b of destination user 110b becomes available.

In the context of an m-business application, the SMS messages may be used for sending sensitive information for example authorizations for performing transactions, e.g. remote banking operations, or financial operations such purchase/sale of shares, or for purchasing goods/services.

According to an embodiment of the present invention, an SMS message signature service is provided in system 100, for authenticating the SMS messages. In particular, the SMS message signature service is implemented and offered by an SMS message signature service provider, schematically represented in the drawing as the block denoted as 130. SMS message signature service provider 130 may for example include a server apparatus that receives and services requests for SMS message signature generation/verification. In particular, SMS message signature service provider 130 may be connected to SMS-C 125 of mobile telephone network 105 by a connection 135. Connection 135 is preferably a secure connection, e.g. a dedicated connection or a connection over a Virtual Private Network (VPN), in which communications between SMS-C 125 and SMS message signature service provider 130 are protected by means of encryption.

In particular, SMS message signature service provider 130 may be identified by a peculiar identifier, e.g. a telephone number, for example a service short phone number, or a so-called "large account" number, that SMS-C 125 can recognize. Thus, SMS messages sent, e.g. by users of mobile telephone network 105, to the number are recognized by SMS-C 125 and are routed to SMS message signature service provider 130, over connection 135.

Figure 2:
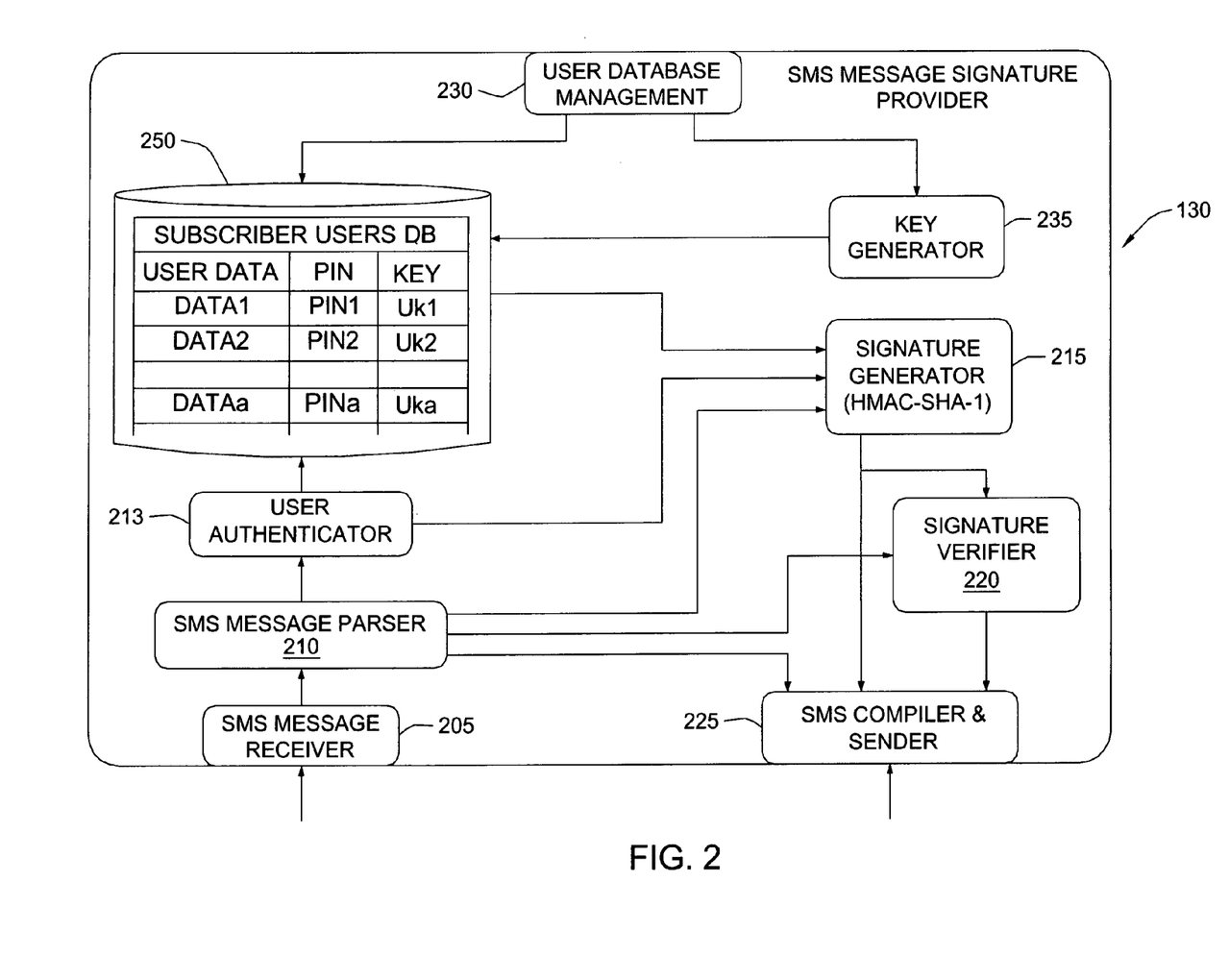
FIG. 2 schematically illustrates, in terms of functional blocks relevant to the understanding of the performed function, the structure of a message signature service provider subsystem according to an embodiment of the present invention.

In FIG. 2 there is schematically depicted the structure of SMS message signature service provider 130 in greater detail, according to an embodiment of the present invention and in terms of the functional blocks relevant to the understanding of the described invention embodiment.

As described in the foregoing, SMS message signature service provider 130 may include a server apparatus, which may comprise a data processing apparatus, such as a personal computer, a workstation, a server machine and the like. The data processing apparatus may be viewed as a plurality of functional units connected in parallel to a data communication bus, in particular, a Central Processing Unit (CPU), typically comprising a microprocessor, e.g. a RISC processor (possibly, the CPU may be made up of several distinct and cooperating CPUs), that control the operation of the data processing apparatus, a working memory, typically a Random Access Memory (RAM) that is directly exploited by the CPU for the execution of programs and for a temporary storage of data, and a Read Only Memory (ROM) that stores a basic program for the bootstrap of the computer. The data processing apparatus may comprise several peripheral units, connected to the bus by means of respective interfaces. Particularly, peripheral units that allow the interaction with a human user may be provided, such as a display device (for example a CRT, an LCD or a plasma monitor), a keyboard and a pointing device (for example a mouse or a touchpad). The data processing apparatus may also include peripheral units for local mass-storage of programs (operating system, application programs, operating system libraries, user libraries) and data, such as one or more magnetic Hard-Disk Drivers (HDD), driving magnetic hard disks, and a CD-ROM/DVD driver, or a CD-ROM/DVD juke-box, for reading/writing CD-ROMs/DVDs. Other peripheral units may be present, such as a floppy-disk driver for reading/writing floppy disks, a memory card reader for reading/writing memory cards, a magnetic tape mass-storage storage unit and the like.

In FIG. 1 for the connection to SMS-C 125, the data processing apparatus of SMS message signature service provider 130 may, for example, exploit a connection to the Internet through an access point (not shown).

The functional blocks depicted in FIG. 2, which will be hereinafter described, may be implemented in hardware, in software or, preferable, as a mix of hardware and software. Thus, the drawing in FIG. 2 may be intended to represent a partial content of the working memory of the data processing apparatus of SMS message signature service provider 130 when in operation.

SMS message signature service provider 130 comprises an SMS message receiver module 205 configured to receive SMS messages that are routed to SMS message signature service provider 130 by SMS-C 125. SMS receiver module 205 communicates with an SMS message parser module 210, configured to analyze (parse) the received SMS messages so as to identify, e.g., signature generation requests or signature verification requests, the SMS message part to be authenticated, user's identification information and the like. A user authenticator module 213 is configured to receive from SMS message parser module 210 information adapted to authenticate a user requesting, for example, the signature of an SMS message. A signature generator module 215 is provided, interacting with SMS message parser module 210, from which it receives the part of the received SMS message to be submitted for signature. Signature generator module 215 also interacts with a database 250 of registered users, containing, for each user who has subscribed for the service, information adapted to identify the user and one or more codes for generating a user-related signature of the received SMS message part. A signature verifier module 220 is provided, configured for verifying the validity of a signature included in a received SMS message. Signature verifier module 220 is in particular configured to receive the signature to be verified from SMS message parser module 210, and to compare it with a new signature generated by signature generator module 215. SMS message parser module 210, signature generator module 215 and signature verifier module 220 communicate with an SMS message compiler and sender module 225, configured to compile and send reply SMS messages to the received SMS messages. In order to compile the reply SMS messages, SMS message compiler and sender module 225 exploits information provided by one or more of the SMS message parser module 210, signature generator module 215 the signature verifier module 220. A users' database management module 230 is also provided, for purposes of management of users' database 250, for example for managing the registration of new subscriber users. User database management module 230 exploits a key generator module 235 for generating users' keys to be stored in database 250 to be exploited by signature generator module 215 for generating the SMS message signatures.

Figure 3A:
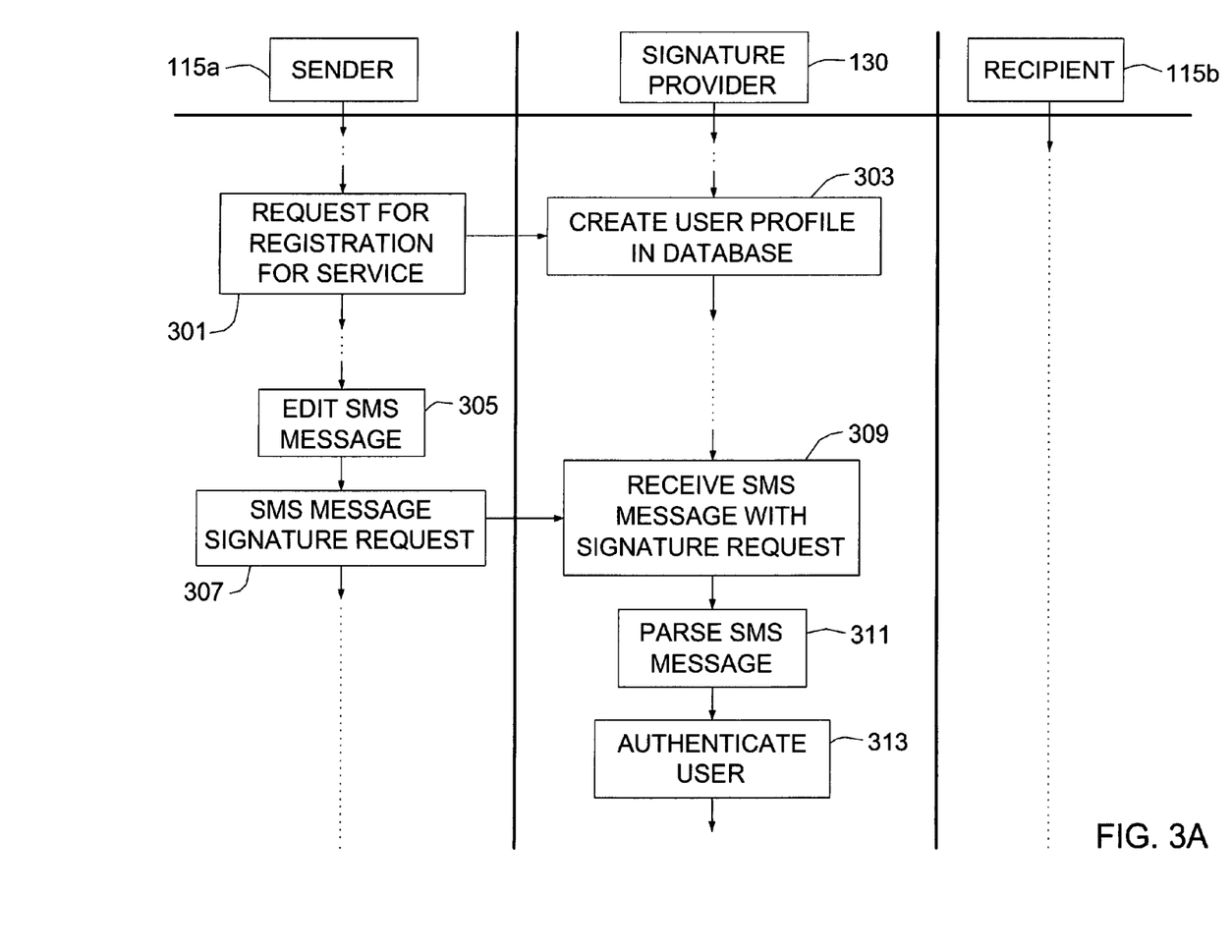
FIGS. 3A to 3C schematic flowcharts illustrating a method according to an embodiment of the present invention.
Figure 3B:
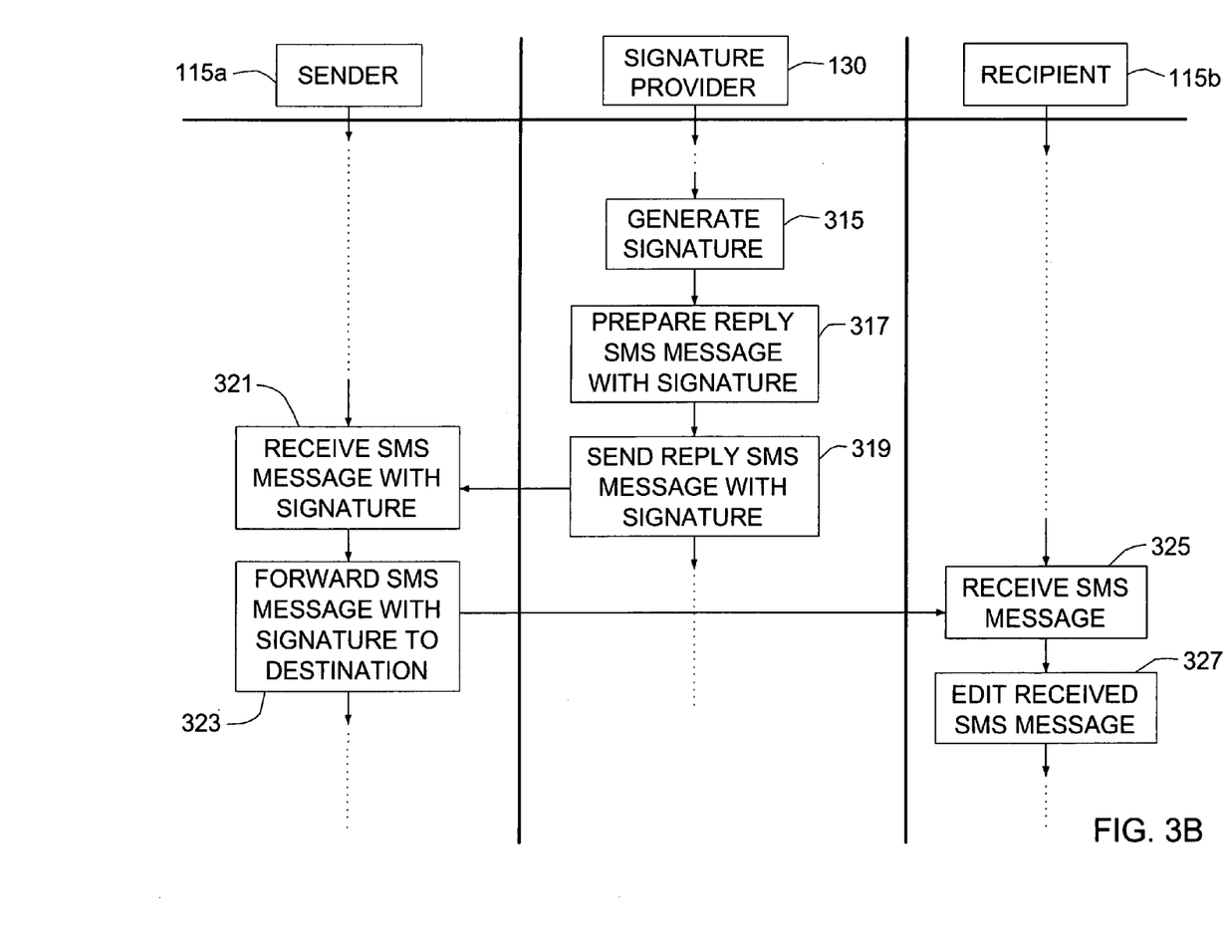
Figure 3C:
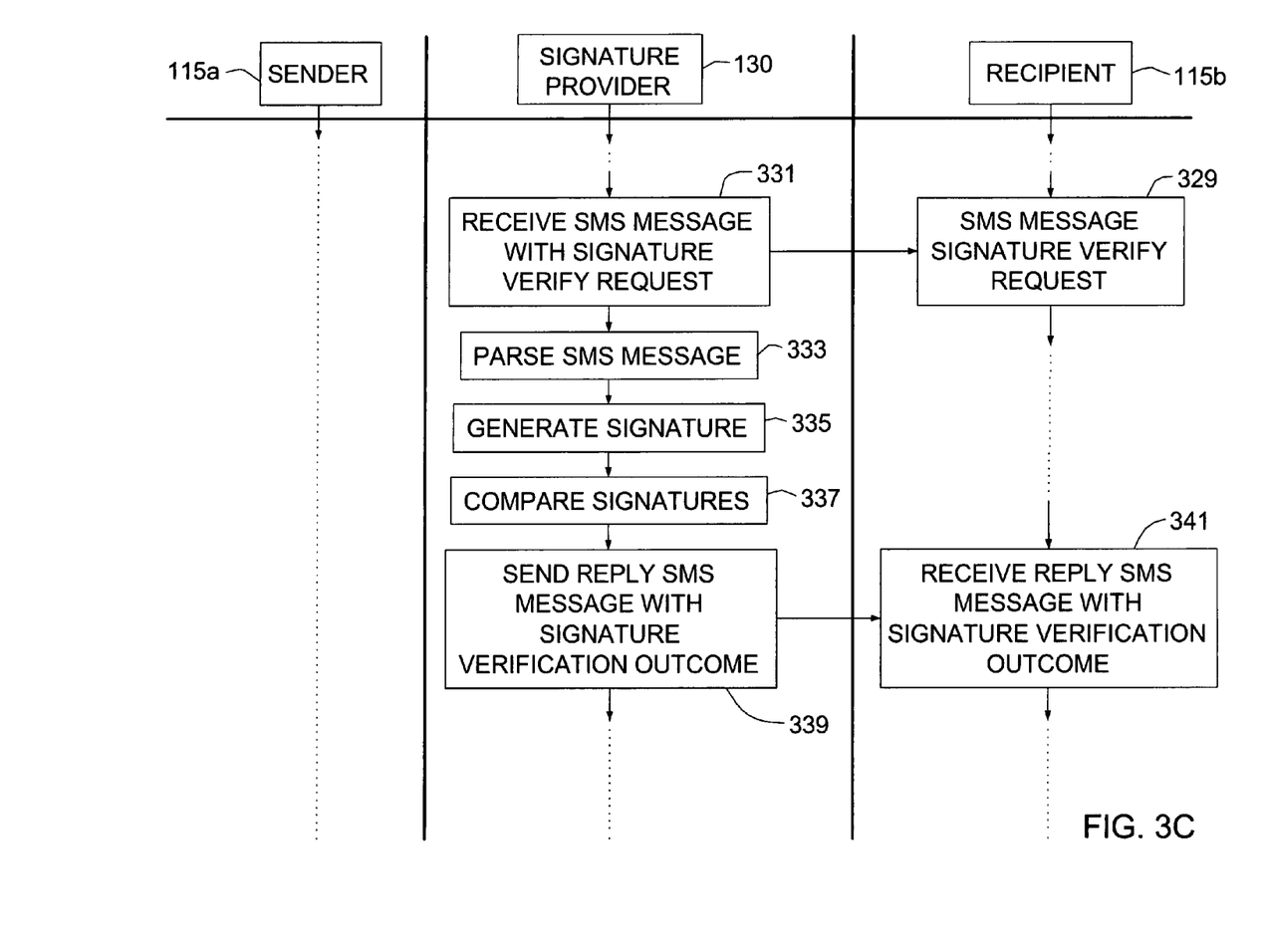

The method of operation of SMS message signature service provider 130 according to an embodiment of the present invention will be hereinafter described, with the help of the schematic flowcharts of FIGS. 3A-3C, wherein the main actions of the different entities (SMS message originator or sender, SMS message signature service provider, SMS message recipient) involved in the method are pictorially shown. FIGS. 4A-4E pictorially show the system of FIG. 1 during a portion the steps of the method.

According to an embodiment of the present invention, the generic user wishing to benefit from the SMS message authentication service offered by SMS message signature service provider 130 has to first register with SMS message signature service provider. To this purpose, the user, e.g. user 110a (see FIG. 1), submits a registration request to SMS message signature service provider 130. The registration request may be submitted in a variety of different ways, for example by means of an SMS message sent by cellular phone 115a (shown in FIG. 1) of user 110a (this is the exemplary case considered in FIG. 3, block 301), via a web-based interface, by sending an electronic mail (e-mail) message, or by means of a voice call.

In order to register for the service, user 110a has to provide personal information, hereinafter referred to as "user data", including for example the name, the surname, possibly the date and place of birth, the address, the mobile telephone (cellular phone) number, and a nickname. The user also has to specify (or he/she may be assigned by SMS message signature service provider 130) a personal code, e.g. a PIN (Personal Identification Number).

Upon receipt of the registration request (with the necessary data) from the requester user 110a, manager module of SMS message signature service provider 130 creates a user profile in user's database 250 (block 303), with the user data ("DATAa" in FIG. 2), the PIN ("PINa" in FIG. 2), and a unique user key ("Uka" in FIG. 2). The key Uka is in particular generated by the key generator module 235. According to an embodiment of the present invention, user key Uka is generated as a digest of a string being a combination of the user data and the PIN; for example, the key Uka can be generated in the following way:

$$Uka = MD5(timestamp + DATAa + PINa)$$

where MD5 is a (non-keyed) message digesting function, the operator "+" stands for an operation of character string concatenation, the operand timestamp includes information about the date and time the key Uka is generated, DATAa is the user data, including for example the following string concatenation:

$$name + surname + email + cellphone + nickname + dateofbirth$$

and PINa is the PIN chosen by the user, for example a 4-digit string.

It is observed that other functions can be utilized for generating the key, for example instead of the MD5 function, a cryptographic hash function SHA1 may be used.

Once generated, user key Uka, which is bound to the user's subscription data (user data, PIN, subscription time and date), is stored in users database 250 in unique association with the user data DATAa and the PIN PINa of user 110a. The key Uka will be exploited by signature generator module 215 for generating the SMS message signature, as will be explained hereinbelow.

Let it be assumed that, after having registered for the service, user 110a wants to send to another user, e.g. user 110b, an SMS message that can be trusted by the recipient as original and not fraudulent: the SMS message can for example be a message carrying an authorization for performing remote banking operations, which in order to be fully trusted by the recipient needs to authenticated. User 110a can apply to SMS message signature service provider 130 to digitally sign the SMS message. In particular, user 110a (the SMS message originator or sender) edits SMS message (block 305) on cellular phone 115a similar to what would be done for any other SMS message. Let it be assumed that the SMS message to be sent by user 110a includes a text t, which is the part of the SMS message to be signed. In the SMS message editing phase user 110a, in addition to the text t to be signed, includes in the SMS message the personal PIN PINa, chosen (or assigned thereto) in the registration phase, to SMS message signature service provider 130, and a "request for signature" command for SMS message signature service provider. The "request for signature" may, for example, be a dedicated string of characters, or even a single character, e.g. the character "R". Thus, the SMS message can include the following string (again, the operator "+" denotes string concatenation):

$$t + PINa + R$$

User 110a then sends the SMS message signature request to the SMS message signature service provider 130 (block 307). To perform this, the user simply sends the SMS message, as would be done with any other SMS message, specifying as the message destination number the number of the SMS message signature service provider (for example, the service short number or large account number assigned by the mobile telephone network operator to the SMS message signature service provider).

It is pointed out that although in a preferred embodiment of the invention the acts of inserting the "request for signature" command and of specifying the number of SMS message signature service provider 130 are performed by user 110a, thereby the user can exploit any commercially available or already circulating cellular phone. The user is not prevented from being provided with specially configured cellular phones and/or SIM cards, adapted to automatize the procedure (for example, a menu option may be made available to the user for editing and sending to SMS message signature service provider 130 an SMS message to be digitally signed).

Figure 4A:
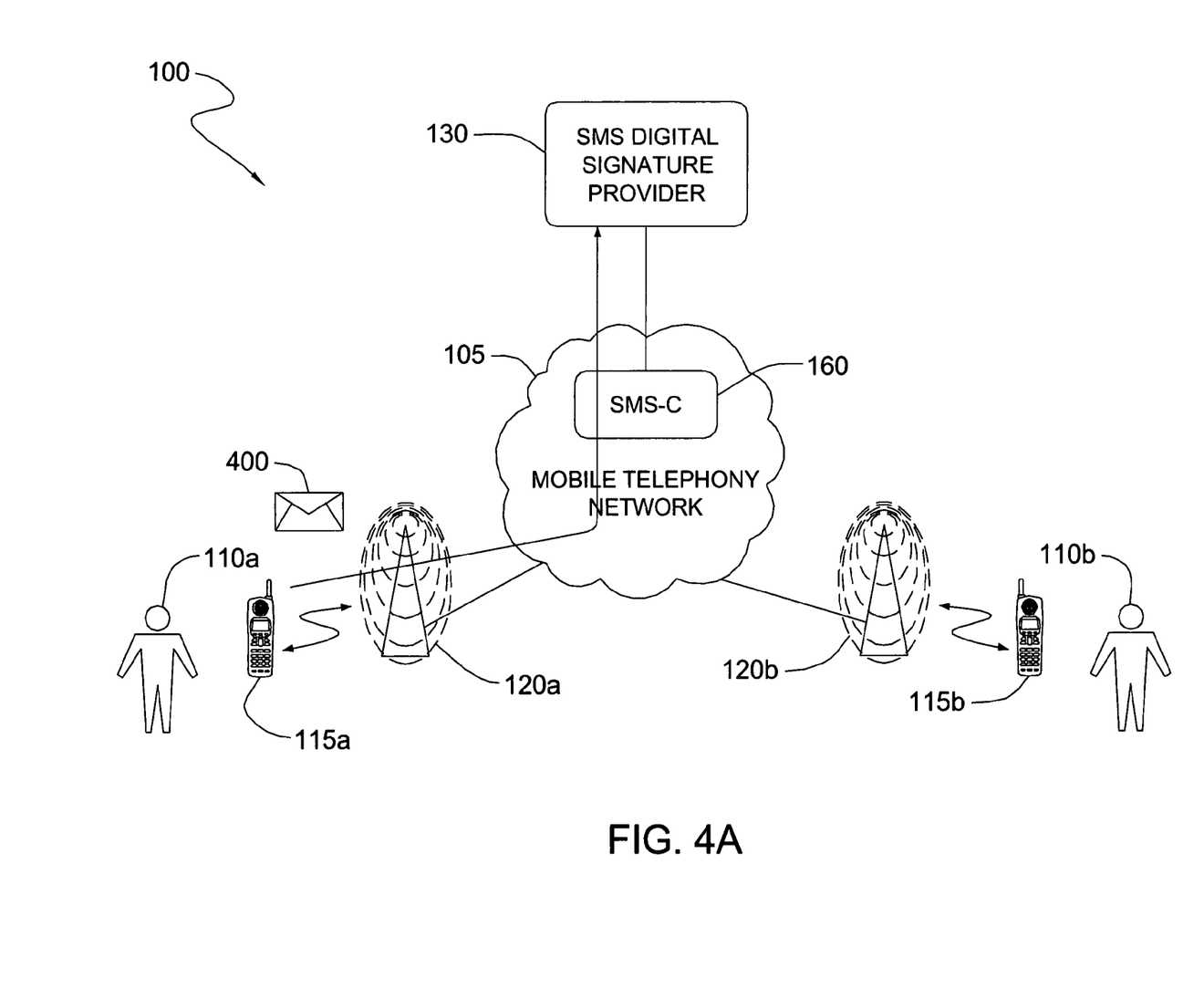
FIGS. 4A to 4E pictorially show the system of FIG. 1 during a portion of the steps of the above-mentioned method.

As pictorially shown in FIG. 4A, the SMS message 400 is received at SMS-C 160, which, recognizing the destination number of SMS message signature service provider 130, routes the message thereto.

SMS message 400 is received by the SMS message receiver module 205 of SMS message signature service provider 130 (block 309), which then passes on the received SMS message to the SMS message parser module 210. SMS message parser module 210 parses the SMS message (block 311), extracting the text t, the PIN PINa, identifying the signature request command R, and the mobile telephone (cellular phone) number of user 110a. The SMS message parser module 210 passes the PIN PINa and the cellular phone number to user authenticator module 213. User authenticator module 213 authenticates user 110a by looking at the respective entry in users database 250 (exploiting, for example, the cellular phone number, or the PIN), and checking whether the provided PIN PINa is correct and that in the database 250, it is associated with the cellular phone number of the sender user (block 313). In the negative case, the authentication fails and SMS message signature service provider 130 may for example notify user 110a, e.g. by a "fail" return SMS message. If instead the authentication is successful, user authenticator module 213 notifies signature generator module 215, which is also notified by SMS message parser module 210 of the received signature request command. Signature generator module 215 then generates the signature for the SMS message (block 315).

In greater detail, in an embodiment of the present invention, signature generator module 215 retrieves the user key Uka from users database 250 (to this purpose, the signature generator module may be provided by the user authenticator module 213 the PIN PINa, or the user's cellular phone number, or any other information adapted to access the database). Alternatively, the key Uka may be retrieved from database 250 by user authenticator module 213, and passed to signature generator module 215.

Signature generator module 215 exploits the key Uka for generating the required message digital signature, for example according to the following formula (eq. 1):

$$S(ka,t) = HMAC\_SHA1(HMAC\_SHA1(t,Uka),KS)$$

wherein HMAC_SHA1 denotes a HMAC (keyed-Hash Message Authentication Code) algorithm exploiting the cryptographic hash function SHA-1, t is (as defined above) the SMS message text portion to be signed, Uka is the user key, and KS is a predefined service provider key univocally assigned to (server apparatus of the) SMS message signature service provider 130, adapted to provide identification of the SMS message signature service provider. In particular, according to an embodiment of the present invention, the service provider key KS is defined by the following formula:

$$KS = MD5(\text{timestamp} + \text{signature service provider sever name} + RND),$$

wherein MD5 is the (non-keyed) message digesting function used for generating the user key Uka (albeit the use of the same message digesting function is not strictly required, and another message digesting function may be exploited; for example, the cryptographic hash function SHA1 can be exploited), the operator "+" stands again for a string concatenation, timestamp includes information about the date and time the key KS is generated, signature service provider sever name is a name assigned to the server apparatus of the signature service provider, and RND is a random number.

The formula (eq. 1) above represents a "depth-two" HMAC_SHA1 keyed-hashing calculation performed on the text t to be signed, where the "first-level" key is the user key Uka and the "second-level" key is the signature service provider key KS. This provides a secure hashing mechanism that is bound to the text t, signature requesting user 110*a* and signature service provider 130. It is however pointed out that different algorithms can be exploited for generating the signature, for example the functions SHA1 or MD5. In particular, the message digital signature may be generated according to either one of the following formulas:

$$S(ka,t) = SHA1(HMAC\_SHA1(t,Uka) + KS),$$

$$S(ka,t) = MD5(HMAC\_SHA1(t,Uka) + KS)$$

The outcome S(ka,t) of, e.g., the keyed-hashing algorithm (eq. 1) implemented by signature generator module 215 is for example an hexadecimal text string, e.g. 30 characters long, that represents the Base64 ASCII text encoding of the signature. Advantageously, the signature generated by signature generator module 215 is relatively short, in particular it is short enough to be transported over an SMS message.

The generated signature S(ka,t) is provided to SMS message compiler and sender module 225, which prepares a reply SMS message (block 317) including the generated signature S(ka,t), the original text t that has been signed, and an identifier Ua of user 110*a*, e.g. the respective cellular phone number and/or the unique nickname provided by the user upon subscribing for the service, for example in a string concatenation S(ka,t)+t+Ua.

Figure 4B:
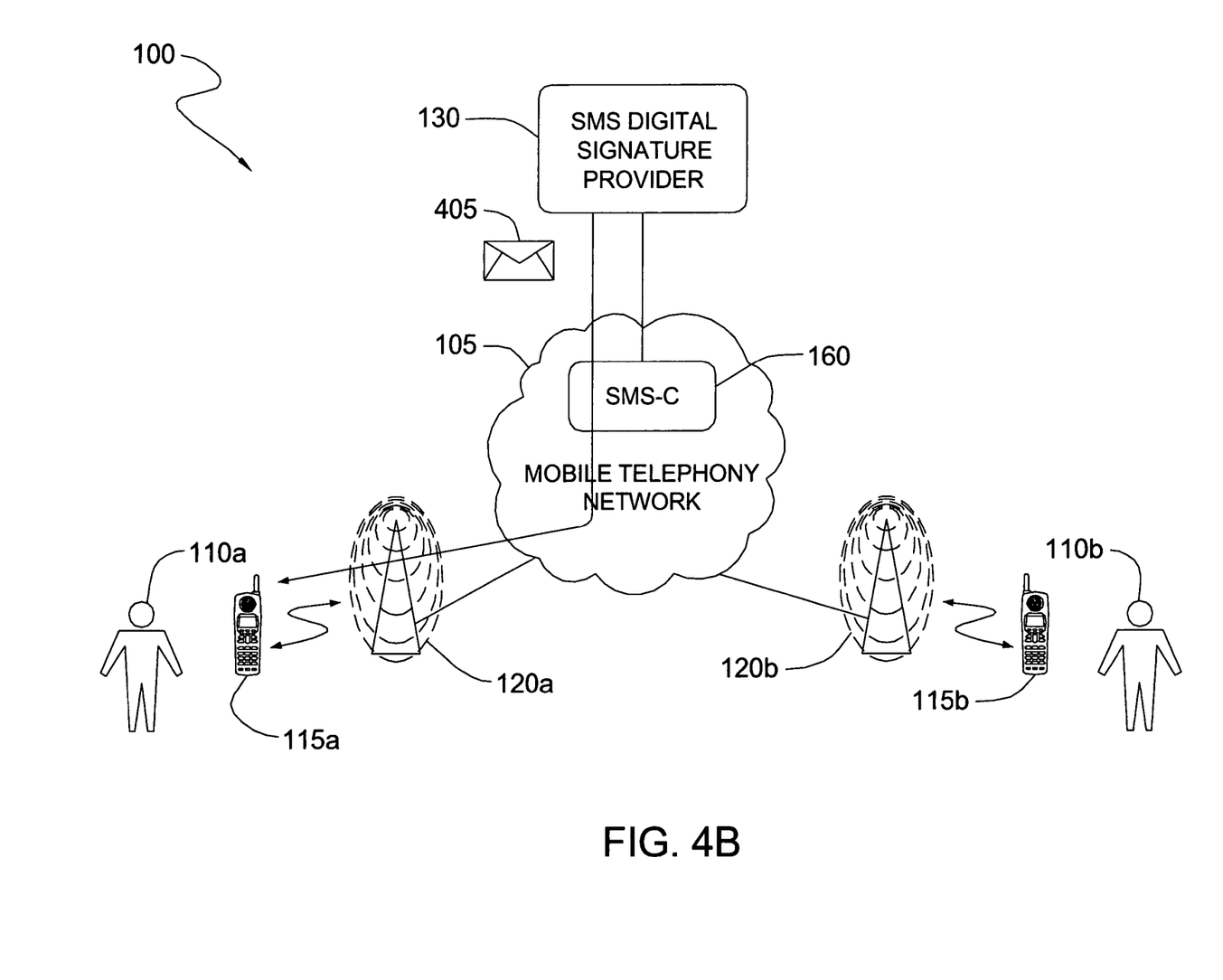
Figure 4C:
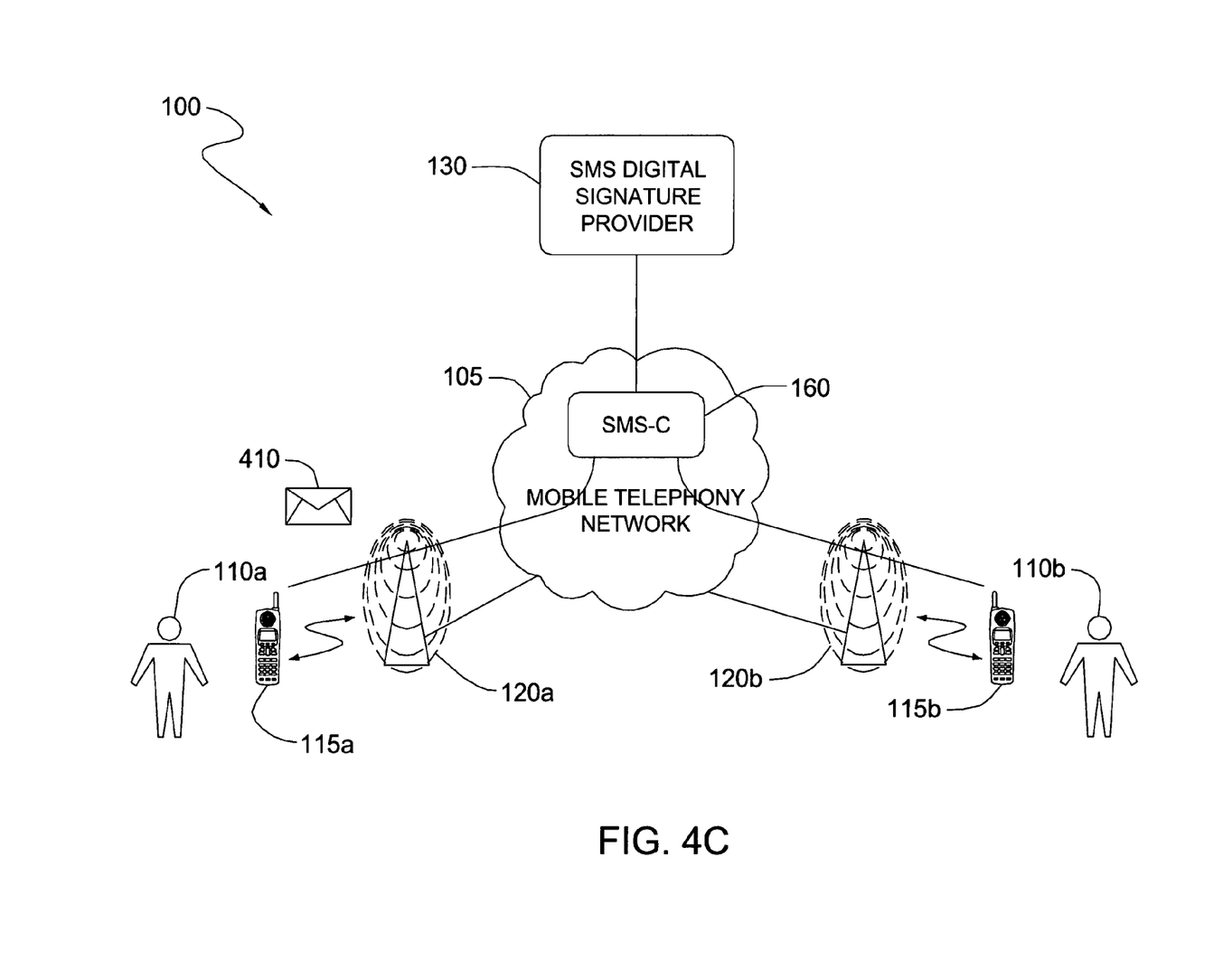
Figure 4D:
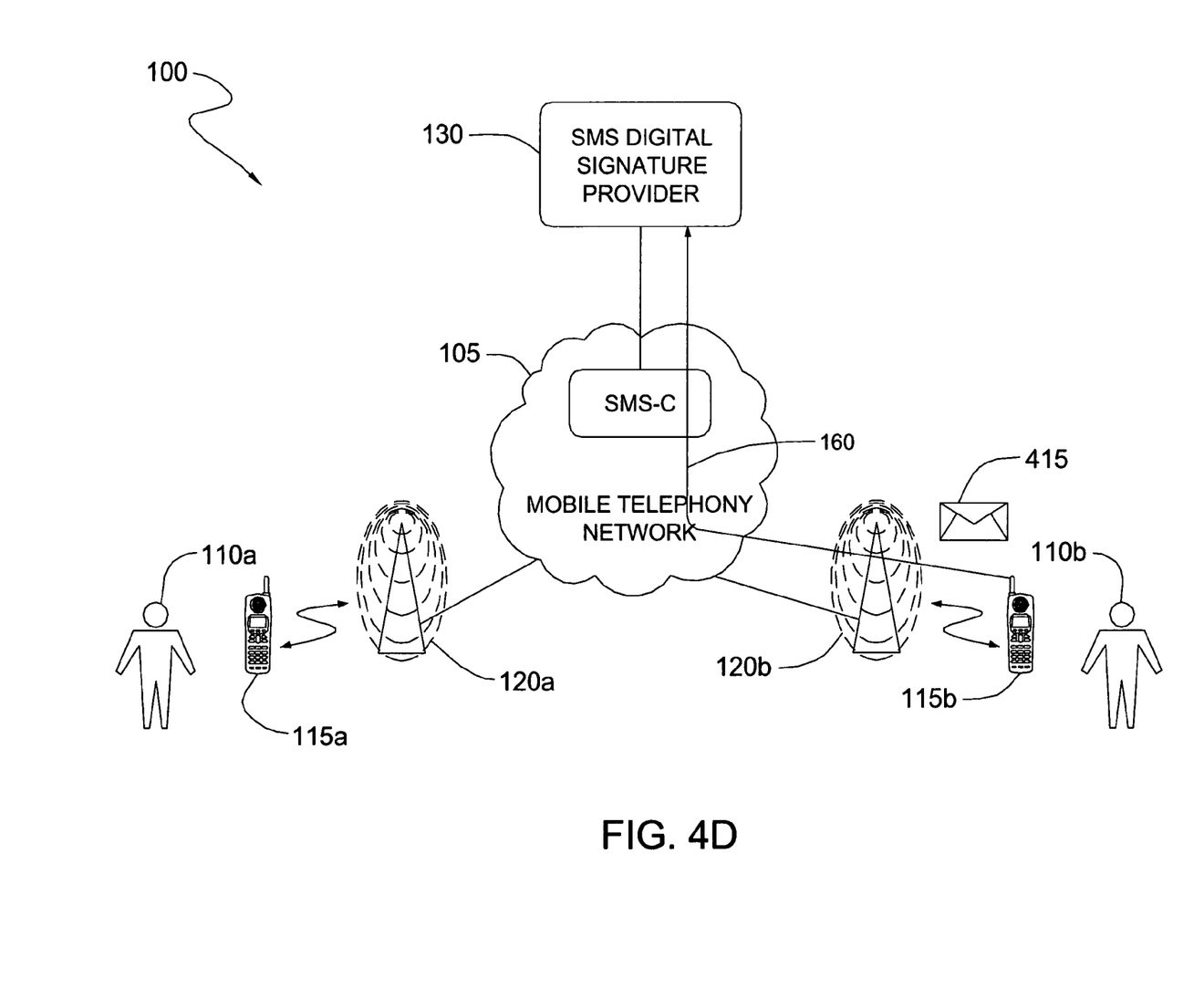
Figure 4E:
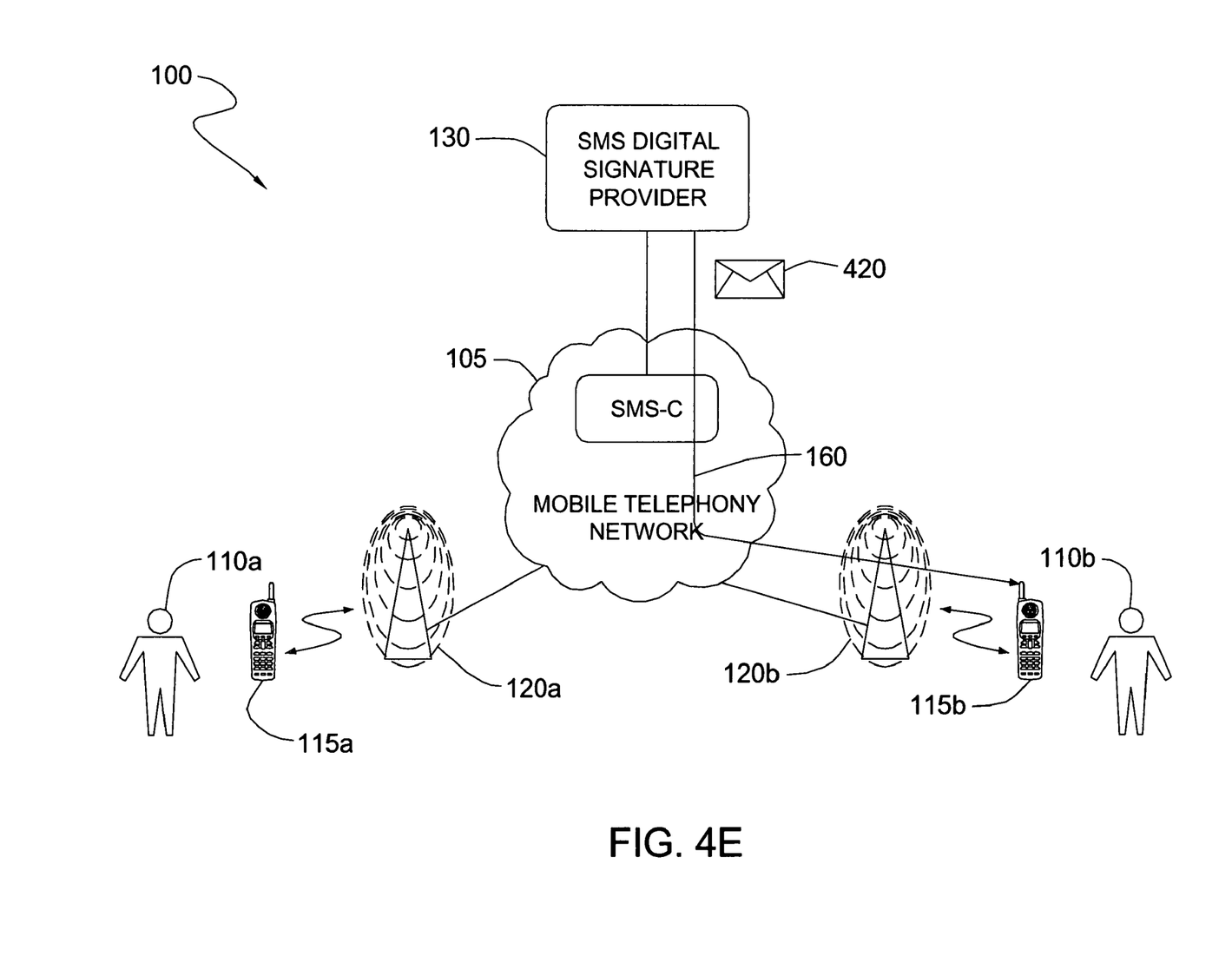

The reply SMS with the signature is then sent to cellular phone 115*a* of user 110*a* (block 319). To this purpose, the cellular phone number of user 110*a* is retrieved from database 250, or extracted from the original SMS message 400. In FIG. 4B, the reply SMS message with the signature is indicated as 405. The delivery of SMS message 405 to cellular phone 115*a* of user 110*a* takes place as described in the foregoing: SMS-C 160 receives SMS message 405 and forwards it to proper destination cellular phone 115*a* (when the latter is available).

When user 110*a* receives SMS message with signature 405 (block 321), the received message is forwarded to user 110*b* (block 323), by specifying the cellular phone number thereof; SMS-C 160 delivers the forwarded SMS message with signature (indicated as 410 in FIG. 4C) to user 110*b*. It is again pointed out that albeit in the preferred embodiment of the invention these actions are performed by the sender user 110*a*, these actions can be automated by provisioning the user with a special cellular phone/SIM card, so that for example when the user wishes to send an authenticated SMS messages to other user 110*b*, chooses a specific menu option, edits the message text, specifies the number of the recipient user, and all the other actions (submission of the message to signature service provider 130, receipt of the signed message therefrom, and forwarding to recipient user 110*b*) are performed automatically.

User 110*b* receives SMS message at cellular phone 115*b* (block 325); user can identify the message sender (e.g., from cellular phone number), read the SMS message text, and determine that the message is signed. In order to have the signature validated, user 110*b* edits the received SMS message (block 327) to include a "signature verify" command, which can, for example, be a predefined string of characters, e.g. a single character, for example, the character "V", which is appended to received SMS message 410; the edited SMS message thus includes the string concatenation S(ka,t)+t+Ua+V. User 110*b* then sends the edited message (denoted as 415 in FIG. 4D) to SMS message signature service provider 130 (block 329), entering the phone number corresponding to the signature service provider.

SMS message 400 is received by SMS message receiver module 205 of SMS message signature service provider 130 (block 331), which then passes on the received SMS message to SMS message parser module 210. SMS message parser module 210 parses the SMS message (block 333), and identifies the "signature verify" command, e.g. the character "V": the SMS message parser module then extracts from the received message the identifier Ua of sender user 110*a* (the identifier Ua was included in the SMS message with signature by SMS message signature service provider 130), and passes the extracted identifier Ua to signature generator module 215, together with the text t of the SMS message.

It is observed that user 110*b*, applying to SMS message signature service provider 130 for having the signature of received SMS message 410 verified, needs not be registered at the SMS message signature service provider. However, nothing prevents that, in order to benefit of the signature verification service, the generic user, like user 110*b*, needs to be registered to the service.

Signature generator module 215 uses the identifier Ua as an accession key to access users database 250 and retrieves the user key Uka therefrom. Using the retrieved key Uka, signature generator module 215 generates the signature for the text t, operating in the way already described in the foregoing.

A new signature $$S'(ka,t)=\text{HMAC\_SHA1}(\text{HMAC\_SHA1}(t,Uka),KS)$$

is generated (block 335). The generated signature S'(ka,t) is fed to signature verifier module 220, together with the signature S(ka,t) extracted (by message parser module 210) from received SMS message 415. Signature verifier module 220 compares the newly generated signature S'(ka,t) to the extracted signature S(ka,t) (block 337). In case S'(ka,t)=S(ka, t), i.e. if the two signatures match, the signature verification process has a positive outcome, meaning that the signature in SMS message 415 that has been received by user 110b is valid. On the contrary, if the newly generated signature S'(ka, t) does not match with the signature S(ka,t) carried by the SMS message, the signature is considered invalid.

SMS message signature service provider 130 replies to user 110b by sending a reply SMS message (denoted as 420 in FIG. 4E) which carries the outcome ("signature valid", "signature invalid") of the signature verification process (block 339); the reply number is extracted by message parser module 210 from received signature verification request SMS message 415.

Once reply SMS message 420 is received by user 110b (block 341), it is ascertained whether message 410 received from user 110a is authenticated or not. User 110b can take the necessary actions (for example, in case SMS message signature service provider 130 found the signature invalid, user 110b can deny the message, or ask user 110a for a confirmation).

It is pointed out that as in the case of the message sender user, nothing prevents automating the procedure for the message recipient of message signature verification, by provisioning the user with a specially configured cellular phone and/or SIM card.

The described method and system provide a simple and relatively cheap way for authenticating message-based communications (person-to-person, person-to-machine, machine-to-machine) in a wireless communications network, particularly SMS-based person-to-person, person-to-machine, machine-to-machine communications in a mobile telephony network such as a GSM network.

In particular, the described method and system are very user-friendly, because users are not requested to perform cumbersome operations, rather they just edit and send SMS messages.

The digital signatures generated according to the described method and system are rather small, and thus can be transported in short messages like SMS messages.

Another advantage of the described method and system is that there is no need to have a special software running on the users' wireless communications terminals, so the there is no need to change/update the existing terminals, nor to provision new SIM cards. Also, there is no impact on the wireless communications network infrastructure.

The signature mechanism is considered sufficiently secure, because it may benefit from the security features of (GSM) mobile telephone networks. For example, so-called "man-in-the-middle" attacks, wherein some entity that pretends to be the true SMS message signature service provider, sniffs the traffic and produces fake responses to signature generation/verification requests by users are almost impossible, because the SMS message signature service provider may be assigned by the (SMS-C of the) mobile telephone network operator a unique phone number (e.g., a service short phone number or large account number), used to exchange SMS messages with the SMS message signature service provider with no possibility of "cloning". The provision of a secure connection between the SMS message signature service provider and the SMS-C (as described in the foregoing) increases the security level.

The use of a unique key identifying the SMS message signature service provider in the generation of the signature makes the generated signature "service provider-dependent", and increases flexibility: different instances of the SMS message signature service provider, being assigned different keys, produces different signatures starting from a same text (and a same requesting user); thus, several SMS message signature service provider instances can be provided for, possibly differentiated by the services offered; a same user may subscribe to the different SMS message signature service provider instances, and every time choose which signature provider instance exploit: the signature generated will be unique and different from the signature that would be generated by a different signature provider instance.

Although the present invention has been disclosed and described by way of some embodiments, it is apparent to those skilled in the art that several modifications to the described embodiments, as well as other embodiments of the present invention are possible without departing from the scope thereof as defined in the appended claims.

In particular, although in the foregoing it has been assumed by way of example that both the message sender and the message recipient users are mobile users, owning mobile communications terminals, e.g. cellular phone, this is not limitative for the present invention: one or both of the users may be connected to a wired communications network.

Also, the functions of generating the signature and that of verifying the signature authenticity might be performed by two distinct entities.

Moreover, albeit in the foregoing reference has often been made to SMS messages, this is not to be intended as a limitation for the present invention, which can in general be used for the authentication of person-to-person, person-to-machine, machine-to-machine messages, particularly but not limitatively text messages, exchanged in either a communications network, such as a mobile telephone network, or a data communications network such as a LAN, a WAN, the Internet; for example, the present invention can be applied to the authentication of electronic mail (e-mail) messages. It is believed that the method and system according to the present invention are particularly suitable in scenarios where the users have communications terminals of limited computational power, and/or the users themselves are not acquainted to technicalities, thus ease of use is a must, and the messages supported by the communications system are relatively small, thereby the digital signature needs to be kept relatively small.

The proposed method and system may be also implemented in terms of a Web service, in which case a message signature service provider may be a server of the World Wide Web.

What is claimed is:

1. In a communications system supporting the exchange of messages, a method for authenticating messages, comprising the step of:

receiving a first message to be authenticated from a message sender to a signature generator entity in the communication system, wherein the signature generator entity is a computer program executed by a processor of a computer system coupled to the communication system;

the processor that executes the signature generator entity generating a signature with respect to the received first message, the signature being dependent on the message sender, wherein said signature comprises a first-level key and a second-level key, wherein the first-level key is determined by information regarding the message sender, and wherein the second-level key is determined by information regarding the signature generator entity;

sending back to the message sender an authenticated first message, the authenticated first message including the generated signature;

forwarding the authenticated first message from the message sender to a message recipient;

receiving, from the message recipient, a second message that requests verifying the forwarded first message;

sending the received second message to a signature verifier entity for a verification outcome of the first message;

receiving the verification outcome from the signature verifier entity that had verified the validity of the signature in the authenticated first message; and notifying the message recipient of the verification outcome.

2. The method of claim 1, wherein the signature generator entity includes the signature verifier entity.

3. The method according to claim 2, wherein the message includes a textual message.

4. The method of claim 1, wherein the communications system includes a wireless communications network.

5. The method according to claim 4, wherein the communications system supports a messaging service, particularly a Short Messaging Service (SMS), and the message to be authenticated includes an SMS message.

6. The method of claim 5, further comprising generating the first-level key based on a user-related key (Uka) based on a timestamp and user data, wherein the timestamp represents a point of time when the signature is generated, and wherein the user data describe a sender user who is associated with the message sender, the user data comprising subscription information that the sender user had provided and had been stored in a subscriber users database coupled to the signature generator entity.

7. The method of claim 6, further comprising having the sender user providing to the signature generator entity a personal identification code (PINa), and having the signature generator entity authenticate the sender user based on the provided personal identification code by generating the first-level key based on the user-related key (Uka) based on the timestamp, the user data, and the personal identification code (PINa).

8. The method of claim 7, further comprising the sender user placing the personal identification code in the SMS message to be authenticated.

9. The method of claim 8, further comprising the signature generator entity utilizing the personal identification code to obtain the user-related key.

10. The method of claim 9, further comprising having the signature generator entity generating said signature by applying a cryptographic hash function to the message to be authenticated, using the user-related key.

11. The method of claim 10, further comprising generating the second-level key of the signature by applying a cryptographic hash function or a digesting function to data comprising an identifier for the signature generator entity, a timestamp for a point of time when said generating is performed, and a random number for security.

12. The method of claim 11, further comprising the signature verifier entity verifying the validity of the signature includes generating a signature of the message using the sender user-related key, and comparing the generated signature with the signature included in the message received from the recipient.

13. A communications network comprising a message authenticator system, the message authenticator system comprising:

a processor and a computer readable storage medium coupled to the processor, said computer readable storage medium containing instructions that when executed by the processor implement the method of claim 12.

14. A system for authenticating messages, comprising:

a processor and a computer readable storage medium coupled to the processor, said computer readable storage medium containing instructions that when executed by the processor implement authenticating messages in the communication system, said authenticating comprising:

receiving a first message to be authenticated from a message sender to a signature generator entity in the communication system, wherein the signature generator entity is a computer program executed by a processor of a computer system coupled to the communication system;

the signature generator entity generating a signature with respect to the received first message, the signature being dependent on the message sender, wherein said signature comprising a first-level key and a second-level key, wherein the first-level key is determined by information regarding the message sender, and wherein the second-level key is determined by information regarding the signature generator entity;

sending back to the message sender an authenticated first message, the authenticated first message including the generated signature;

forwarding the authenticated first message from the message sender to a message recipient;

receiving, from the message recipient, a second message that requests verifying the forwarded first message;

sending the received second message to a signature verifier entity for a verification outcome of the first message;

receiving the verification outcome from the signature verifier entity that had verified the validity of the signature in the authenticated first message; and notifying the message recipient of the verification outcome.

15. In a communications system supporting the exchange of messages, a method for authenticating messages, comprising the steps of:

sending a message to be authenticated from a message sender to a signature generator entity in the communication system, the signature generator entity generating a signature with respect to the received message, the signature being dependent on the message sender, and sending back to the message sender an authenticated message, the authenticated message including the generated signature;

forwarding the authenticated message from the message sender to a message recipient;

sending the received message from the message recipient to a signature verifier entity; and the signature verifier entity verifying the validity of the signature, and notifying the message recipient of an outcome of the validity verification, wherein the communications system includes a wireless communications network, wherein the communications system supports a messaging service, particularly a Short Messaging Service (SMS), and the message to be authenticated includes an SMS message, wherein said generating further comprising generating the signature based on a user-related key (Uka), wherein said method further comprises having a sender user providing to the signature generator entity a personal identification code (PINa), and having the signature generator entity authenticate the sender user based on the provided personal identification code, wherein said method further comprises the sender user placing the personal identification code in the SMS message to be authenticated, wherein said method further comprises the signature generator entity utilizing the personal identification code to obtain the user-related key, wherein said method further comprises having the signature generator entity generating said signature by applying a cryptographic hash function to the message to be authenticated, using the user-related key, and wherein said method further comprises utilizing a signature generator entity-related key in addition to the user-related key for generating the signature, by applying a cryptographic hash function or a digesting function.

16. The method of claim 15, wherein the step of the signature verifier entity verifying the validity of the signature includes generating a signature of the message using the sender user-related key, and comparing the generated signature with the signature included in the message received from the recipient.

17. A communications network supporting a messaging system, a message authenticator system comprising means adapted for carrying out the method of claim 16.

18. A message authentication service for authenticating messages comprising implementing the method of claim 16 in the communication system.

19. A Web service for implementing the message authentication service according to claim 18.

* * * * *

UNITED STATES PATENT AND TRADEMARK OFFICE
CERTIFICATE OF CORRECTION

PATENT NO.       : 7,634,280 B2                                          Page 1 of 1
APPLICATION NO.  : 11/346109
DATED            : December 15, 2009
INVENTOR(S)      : Leonardo Modeo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 988 days.

Signed and Sealed this

Ninth Day of November, 2010

David J. Kappos
*Director of the United States Patent and Trademark Office*